United States Patent
Ando et al.

(10) Patent No.: US 7,119,317 B2
(45) Date of Patent: Oct. 10, 2006

(54) WIDE DYNAMIC RANGE IMAGER WITH SELECTIVE READOUT

(75) Inventors: Haruhisa Ando, Tokyo (JP); Toshinori Otaka, Chiba (JP)

(73) Assignee: Micron Technology, Inc., Boise, ID (US)

( * ) Notice: Subject to any disclaimer, the term of this patent is extended or adjusted under 35 U.S.C. 154(b) by 246 days.

(21) Appl. No.: 10/901,180

(22) Filed: Jul. 29, 2004

(65) Prior Publication Data

US 2006/0011810 A1   Jan. 19, 2006

(30) Foreign Application Priority Data

Jul. 13, 2004   (JP) ............................. 2004-206319

(51) Int. Cl.
*H01L 27/00*   (2006.01)
(52) U.S. Cl. .................................. 250/208.1; 348/308
(58) Field of Classification Search ........ 348/302–304, 348/274, 281, 275; 257/233, 239; 250/208.1
See application file for complete search history.

(56) References Cited

U.S. PATENT DOCUMENTS 6,307,195 B1 * 10/2001 Guidash .................. 250/208.1

| 6,710,804 | B1 | 3/2004 | Guidash |
| 6,741,198 | B1 | 5/2004 | McIlrath |
| 2004/0041077 | A1 | 3/2004 | Fossum |
| 2004/0041927 | A1 | 3/2004 | Cho et al. |

OTHER PUBLICATIONS

Orly Yadid-Pecht, et al., "Wide Intrascene Dynamic Range CMOS APS Using Dual Sampling", IEEE Transactions on Electron Devices, vol. 44, No. 10, Oct. 1997.

* cited by examiner

*Primary Examiner*—Thanh X. Luu
*Assistant Examiner*—Tony Ko
(74) *Attorney, Agent, or Firm*—Dickstein Shapiro LLP

(57) ABSTRACT

A wide dynamic range imager with a dual integration, selective readout operating method that requires only one readout chain. First signals from a row of pixels are digitized and stored into a memory after a first integration period. A flag is set and stored in the memory for each pixel that reached a threshold value during the first integration period. Second signals from the row are read after a second shorter integration period. If the pixel's corresponding flag bit was set, the second signal is stored (overwriting the first signal) and is subsequently used by processing circuitry to generate the appropriate pixel signal based on a full range signal and the second signal. Otherwise, the first signal is processed by the processing circuitry.

48 Claims, 9 Drawing Sheets

WIDE DYNAMIC RANGE IMAGER WITH SELECTIVE READOUT

FIELD OF THE INVENTION

The invention relates generally to imaging devices and more particularly to wide dynamic range imaging devices with selective readout.

BACKGROUND

A CMOS imager circuit includes a focal plane array of pixel cells, each one of the cells including a photosensor, for example, a photogate, photoconductor or a photodiode overlying a substrate for accumulating photo-generated charge in the underlying portion of the substrate. Each pixel cell has a charge storage region, formed on or in the substrate, which is connected to the gate of an output transistor that is part of a readout circuit. The charge storage region may be constructed as a floating diffusion region. In some imager circuits, each pixel may include at least one electronic device such as a transistor for transferring charge from the photosensor to the storage region and one device, also typically a transistor, for resetting the storage region to a predetermined charge level prior to charge transference.

In a CMOS imager, the active elements of a pixel cell perform the necessary functions of: (1) photon to charge conversion; (2) accumulation of image charge; (3) resetting the storage region to a known state before the transfer of charge to it; (4) transfer of charge to the storage region accompanied by charge amplification; (5) selection of a pixel for readout; and (6) output and amplification of a signal representing pixel charge. Photo charge may be amplified when it moves from the initial charge accumulation region to the storage region. The charge at the storage region is typically converted to a pixel output voltage by a source follower output transistor.

CMOS imagers of the type discussed above are generally known as discussed, for example, in U.S. Pat. No. 6,140,630, U.S. Pat. No. 6,376,868, U.S. Pat. No. 6,310,366, U.S. Pat. No. 6,326,652, U.S. Pat. No. 6,204,524 and U.S. Pat. No. 6,333,205, assigned to Micron Technology, Inc., which are hereby incorporated by reference in their entirety.

A typical four transistor (4T) CMOS image pixel 10 is shown in FIG. 1. The pixel 10 includes a photosensor 12 (e.g., photodiode, photogate, etc.), transfer transistor 14, floating diffusion region FD, reset transistor 16, source follower transistor 18 and row select transistor 20. The photosensor 12 is connected to the floating diffusion region FD by the transfer transistor 14 when the transfer transistor 14 is activated by a transfer gate control signal TX.

The reset transistor 16 is connected between the floating diffusion region FD and an array pixel supply voltage Vaa_pix. A reset control signal RST is used to activate the reset transistor 16, which resets the floating diffusion region FD to the array pixel supply voltage Vaa_pix level as is known in the art.

The source follower transistor 18 has its gate connected to the floating diffusion region FD and is connected between the array pixel supply voltage Vaa_pix and the row select transistor 20. The source follower transistor 18 converts the charge stored at the floating diffusion region FD into an electrical output voltage signal Vout. The row select transistor 20 is controllable by a row select signal SEL for selectively connecting the source follower transistor 18 and its output voltage signal Vout to a column line 22 of a pixel array.

An important performance characteristic of any imager is its dynamic range. A large dynamic range is desirable in applications for sensing low light signals and capturing images with large variations in illuminance or brightness. In particular, the dynamic range of an imager can be defined as the ratio of the minimum illuminance the imager detects under saturation to the illuminance the imager detects at signal-to-noise ratio (SNR) equal to one. The dynamic range of a scene can also be expressed as the ratio of its highest illumination level to its lowest illumination level.

Intrascene dynamic range refers to the range of incident signal that can be accommodated by an imager in a single frame of image data. Examples of scenes that generate high dynamic range incident signals include an indoor room with outdoor window, outdoor mixed shadow and bright sunshine, night time scenes combining artificial lighting and shadows, and in automotive context, an auto entering or about to leave a tunnel or shadowed area on a bright day.

Many different types of approaches for creating imaging devices with high dynamic range have been described in the literature. A common denominator of most approaches relies on companding (i.e., signal values are rounded on a non-linear scale, compressed and then expanded using the same non-linear scale) within the pixel by having either a total conversion to a log scale (so-called logarithmic pixel) or a mixed linear and logarithmic response region in the pixel. These approaches have several major drawbacks. First, the knee point in linear-to-log transition is difficult to control leading to fixed pattern noise in the output image. Second, under low light the log portion of the circuit is slow to respond leading to lag. Third, a logarithmic representation of the signal in the voltage domain (or charge domain) means that small variations in signal due to fixed pattern noise leads to large variations in the represented signal.

Linear approaches have also been used to increase dynamic range where the integration time is varied during a frame capture to generate several different integrated pixel signals. In the context of a CMOS pixel, integration time refers to the time period during which a capacitor or charge well accumulates a charge or discharges a voltage from a pre-charge level (i.e., from a reset voltage level) as a result of the photosensor's exposure to incident light. The integrated signal is then read-out and sampled. If a pixel's stored charge rises or falls to a point where it cannot further increase or decrease during the integration period, then it is said that the pixel has reached its saturation point.

FIG. 2 illustrates a portion of a conventional imager device 50 that uses a dual sampling, dual output approach for increasing intrascene dynamic range. The device 50 is described by Yadid-Pecht et al. in "Wide Intrascene Dynamic Range CMOS APS Using Dual Sampling", IEEE Transactions on Electron Devices, Vol. 44, No. 10, pp. 1721–23, October 1997. The device 50 includes an array 60 of pixel cells 10 and two column parallel readout chains 54, 56. In operation, a first row of pixels ROW N is copied into the first readout chain 54 and is reset during the process. Immediately after this operation, a second row ROW N-D is copied into the second readout chain 56 (also reset during the process). The readout chains 54, 56 are scanned and pixel signals are read out and fused off-chip.

Although the device 50 has increased intrascene dynamic range, it requires an additional readout chain 56, large die size and multiple input/output (I/O) pins, which are undesirable. Accordingly, there is a desire and need for an imager and method of operating the imager that increases dynamic range without increasing die size and the number of I/O pins used by the imager.

SUMMARY

The invention provides an imager and method of operating the imager that has increased dynamic range without increased die size and number of I/O pins.

The above and other features and advantages are achieved in various exemplary embodiments of the invention by providing an imager with a dual integration, selective readout operating method that requires only one readout chain. First signals from a row of pixels are digitized and stored into a memory after a first integration period. A flag is set and stored in the memory for each pixel that reached a predetermined threshold during the first integration period. Second signals from the same row are read after a second shorter integration period. If the pixel's corresponding flag bit was set, the second signal is stored (overwriting the first signal) and is subsequently used by processing circuitry to generate the appropriate pixel signal based on a combination of a full range signal and the second signal. Otherwise, the first signal is processed by the processing circuitry.

BRIEF DESCRIPTION OF THE DRAWINGS

The foregoing and other advantages and features of the invention will become more apparent from the detailed description of exemplary embodiments provided below with reference to the accompanying drawings in which.

DETAILED DESCRIPTION

The invention provides a wide dynamic range for an imager by using two different integration periods per frame and a selective readout process. It is desirable that the first integration period be a standard integration period often used in today's imagers while the second integration period is less than or equal to a single horizontal line period (referred to herein as "1H"). Since the first integration period is longer than the second integration period, the first integration period is sometimes referred to herein as the long integration period while the second integration is sometimes referred to herein as the short integration period.

As is discussed below in more detail, the invention has a simple architecture where sample and hold (S/H), analog-to-digital converter (ADC) and memory circuits are built on one side of the imager's pixel array (in a parallel column architecture to form a single readout chain). The invention utilizes a selective readout process. As such, there is only one readout chain and no redundant readouts, which provides high speed readout and a reduced number of I/O pins. The invention uses linear output signals, which provides simple signal processing even for color signals (as explained below in more detail).

Figure 3:
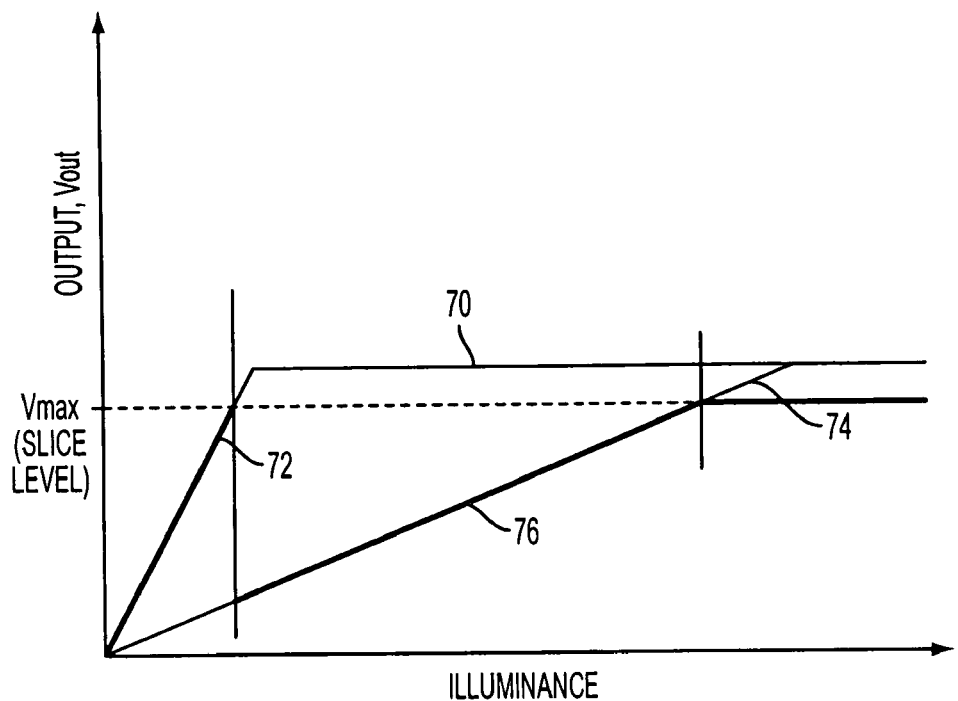
FIG. 3 is a graph illustrating pixel output v. illuminance for pixels signals from long and short integration periods.

Referring to the figures, where like reference numbers designate like elements, FIG. 3 shows a graph of pixel output Vout v. illuminance for pixels signals obtained from long and short integration periods. The first curve 70 represents the long integration period, while the second curve 74 represents the short integration period. If there is strong illumination during the long integration period, the pixel and its output Vout eventually saturates. When this happens, the output beyond the saturation level contains no additional information regarding the strength of the signal (other than that the fact that the signal has reached saturation). As is described below, however, when this occurs meaningful information is obtained from the output Vout obtained from the second shorter integration period.

Accordingly, one of the principles of the present invention is that useful output signal information is either the non-saturated signal obtained from the long integration period (see region 72) or the signal obtained from the short integration period (region 76) when the first integration period results in saturation. In addition, it is not necessary or important that the imager retains all of the signals from both integration periods. In fact, all that is required to obtain wide dynamic range is that either the information contained in region 72 (when not saturated) or region 76 (when there is saturation) is retained for each pixel.

One important aspect of the invention is the use of a signal slice level Vmax as a saturation point rather than the actual saturation point of the pixel. Use of the signal slice Vmax avoids problems associated with non-uniform saturation levels across the imager. This is particularly beneficial when the output signals are synthesized as shown in FIG. 4.

Figure 4:
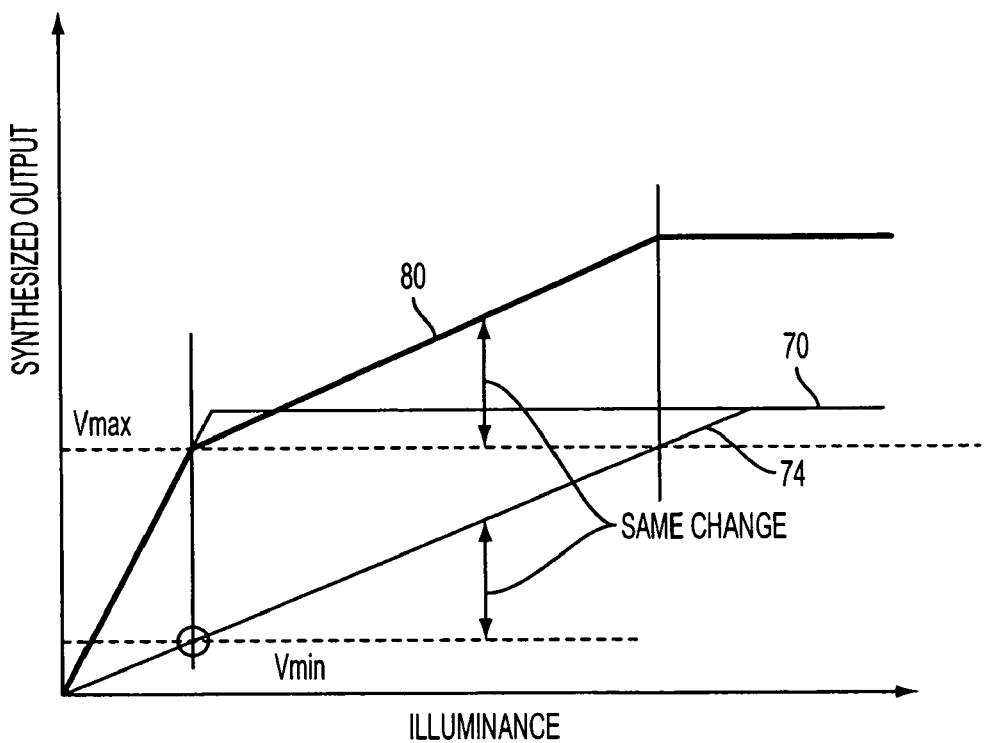
FIG. 4 is a graph illustrating synthesized pixel output v. illuminance.

Referring to FIG. 4, curve 80 represents a synthetic pixel output according to the invention. As can be seen from the curve 80, when there has not been enough illumination to saturate the pixel, the synthetic output contains the output from the long integration period without any signal processing. That is, $$\text{synthetic output} = V\text{out(long)}, \quad (1)$$

where Vout(long) is the pixel output from the long integration period. However, when Vout(long) reaches Vmax, the pseudo saturation level, the synthetic output contains the output from the short integration period added to the saturation level as follows:

$$\text{synthetic output} = M^* V\text{out(short)} + V\text{max} - V\text{min}, \quad (2)$$

where Vout(short) is the pixel output from the short integration period, Vmin is the value of Vout(short) when Vout(long) reaches Vmax and M is a multiplication factor determined by an image processor (described below).

Figure 1:
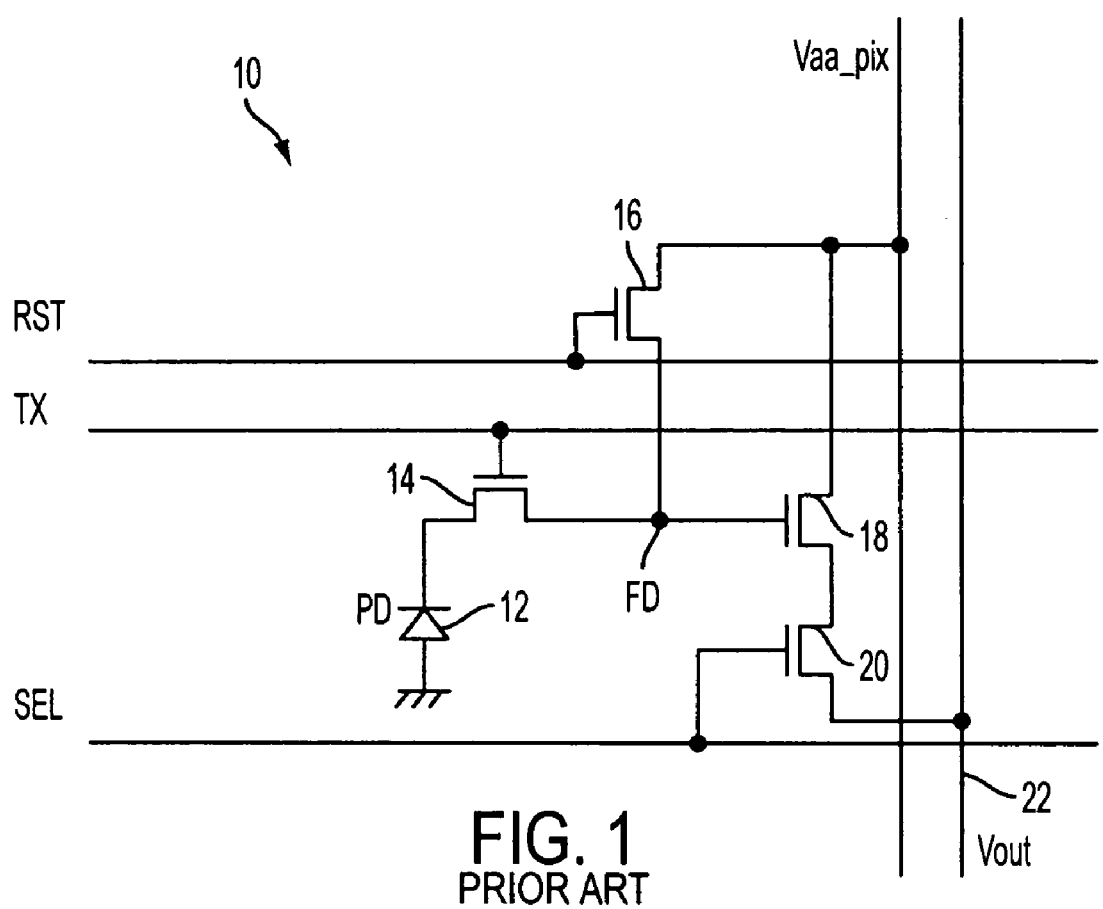
FIG. 1 illustrates a conventional imager pixel circuit.
Figure 2:
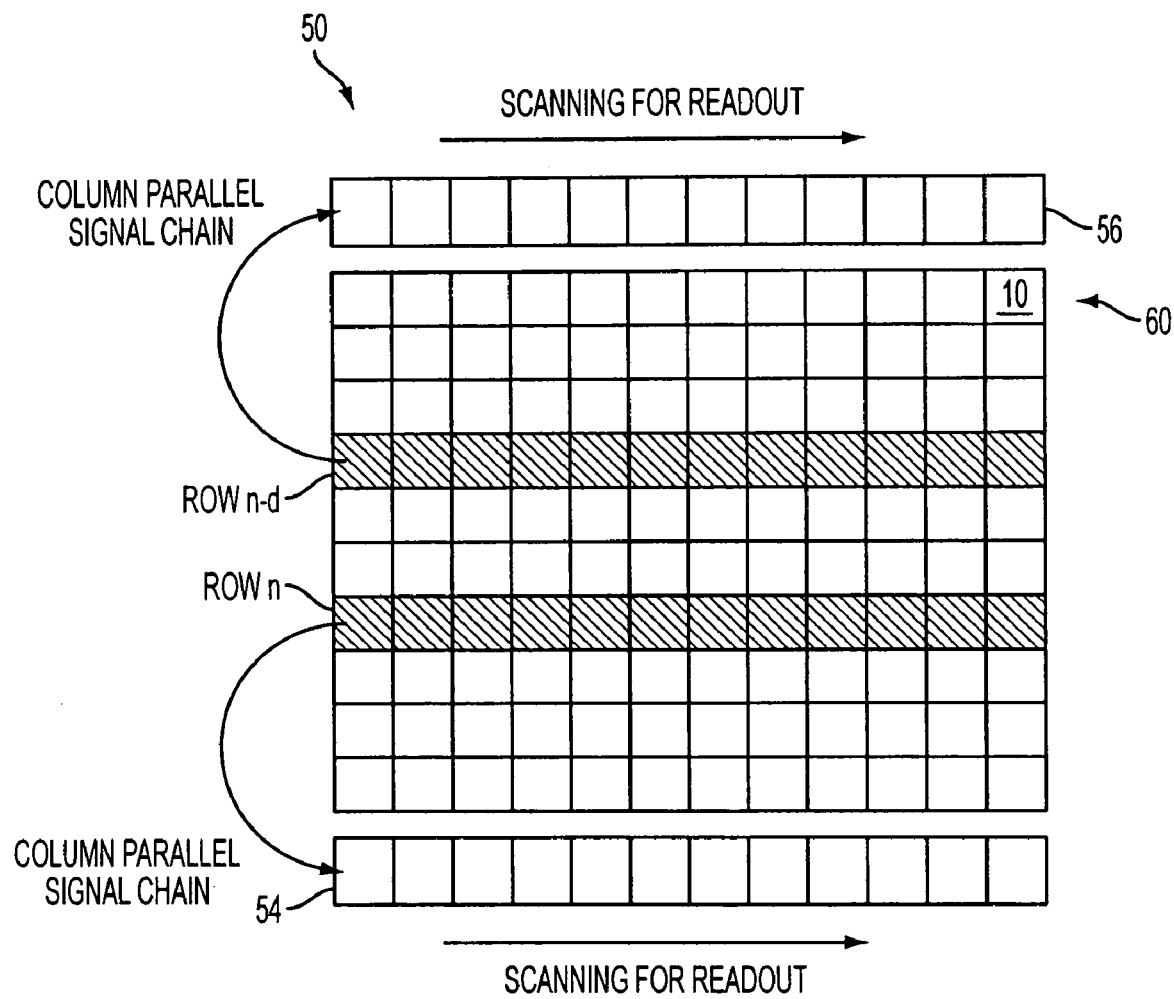
FIG. 2 illustrates a portion of a conventional imaging device.
Figure 5:
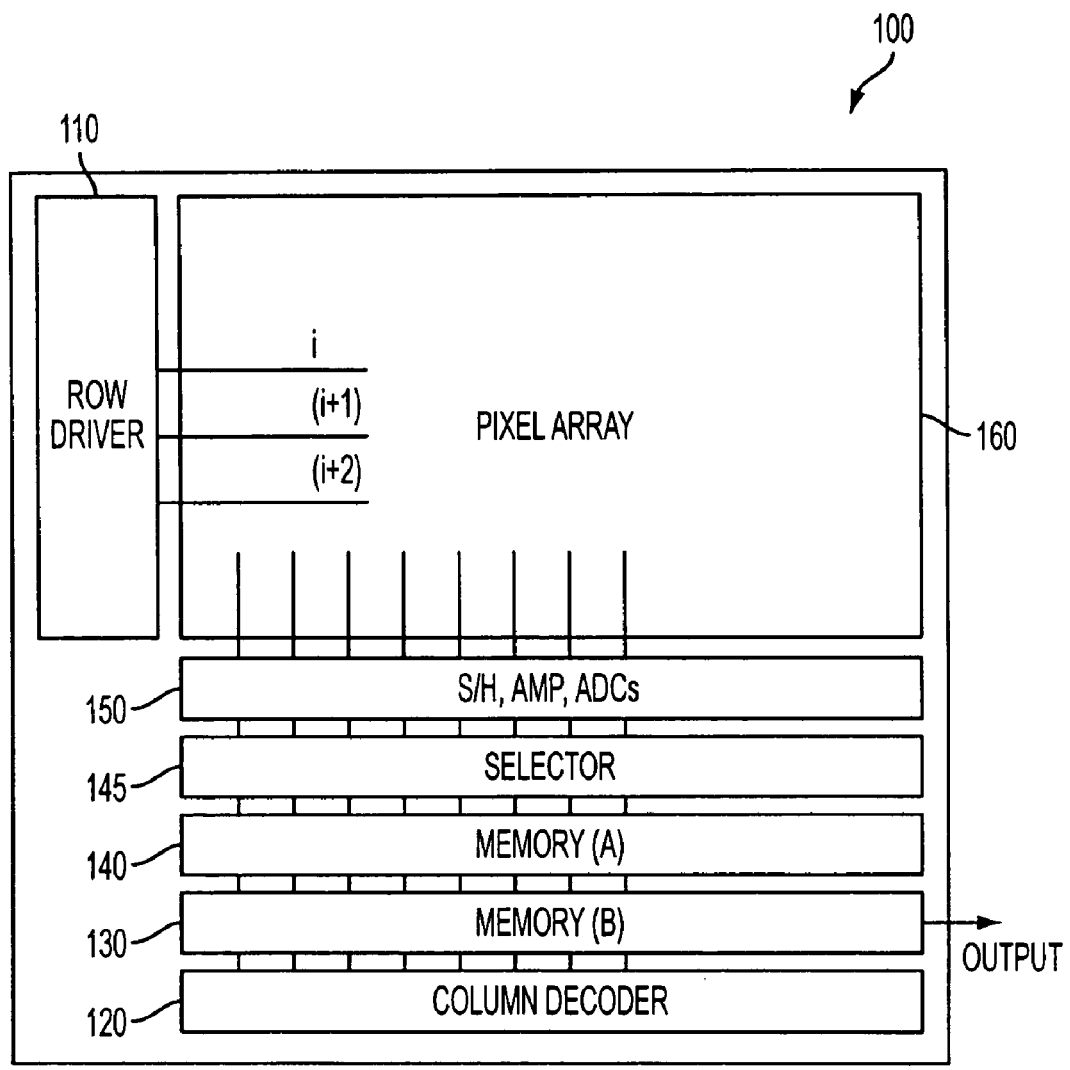
FIG. 5 illustrates a portion of an exemplary image sensor constructed in accordance with an embodiment of the invention.

FIG. 5 illustrates a portion of an exemplary image sensor 100 that utilizes the above-described principles of the invention. The sensor 100 includes a row driver 110, column decoder 120, two memory circuits 130, 140, a selector circuit 145, readout circuitry 150 (comprising sample and hold, differential amplifier and analog-to-digital converter circuitry), and a pixel array 160. The array 160 includes pixels, such as the pixel 10 illustrated in FIG. 1, arranged in a predetermined number of rows (e.g., ROW I, ROW(I+1), ROW(I+2)) and columns. The pixels discussed herein are illustrated and described as four transistor (4T) pixel circuits for the sake of example only. It should be understood that the invention is not limited to a four transistor (4T) pixel, but may be used with other pixel arrangements having fewer (e.g., 3T) or more (e.g., 5T) than four transistors.

The illustrated sample and hold circuits, amplifiers and analog-to-digital converters within the readout circuitry 150 are arranged in parallel for column parallel processing as is known in the art. In operation, the pixels of each row in the array 160 are all turned on at the same time by a row select line SEL (FIG. 1) driven by the row driver 110. Next, reset and pixel signals from each pixel in the selected row (e.g., ROW I) are sampled and held, and differentially amplified to form a differential signal that is converted to a digital signal in the readout circuitry 150.

At first, the pixels in the selected row are reset, which starts the long integration period. Reset signals Vrst from the selected row are read into the sample and hold circuitry of the readout circuitry 150. At the end of the long integration period, pixel signals Vsig from the selected row are read into the readout circuitry 150, where the differential signal (Vout=Vrst−Vsig) is generated and converted into a digital signal. The selector circuit 145 determines for each read-out pixel whether the pixel output Vout has reached Vmax. If a particular pixel's output Vout has reached Vmax, then the selector 145 sets the pixel's corresponding flag bit to a value indicating saturation (e.g., logical 1). The digital data representing Vout and the flag bit are written into the first memory 140. It should be noted that the long integration period can be controlled by applying pulses of the transfer and reset control signals TX, RST (FIG. 1) according to the present illuminance condition (i.e., automatic light control techniques can be used with the invention).

The pixels of the selected row are reset again. This starts the short integration period, which will last no longer than one horizontal line period (1H). Reset signals Vrst from the selected row are read into the sample and hold circuitry. At the end of the short integration period, pixel signals Vsig from the selected row are read into the readout circuitry 150, where the differential signal (Vout=Vrst−Vsig) is generated and converted into a digital signal. If the flag associated with the pixel indicates saturation during the long integration period, the Vout associated with the short integration period is written into the first memory 140. It should be appreciated that the flag bit can be replaced with the carry bit of the ADC, if desired.

The contents of the first memory 140 (i.e., Vout associated with either the long or short integration periods and corresponding flag bits) are then copied into the second memory 130. The digital information is read out of the second memory 130 under the control of the column decoder 120. Thus, the image sensor 100 of the invention performs a dual integration period scheme, yet uses only a single readout chain (comprised of the readout circuitry 150, selector 145, first and second memory circuits 140, 130 and the column decoder 120) to increase the dynamic range of the sensor 100.

Figure 6:
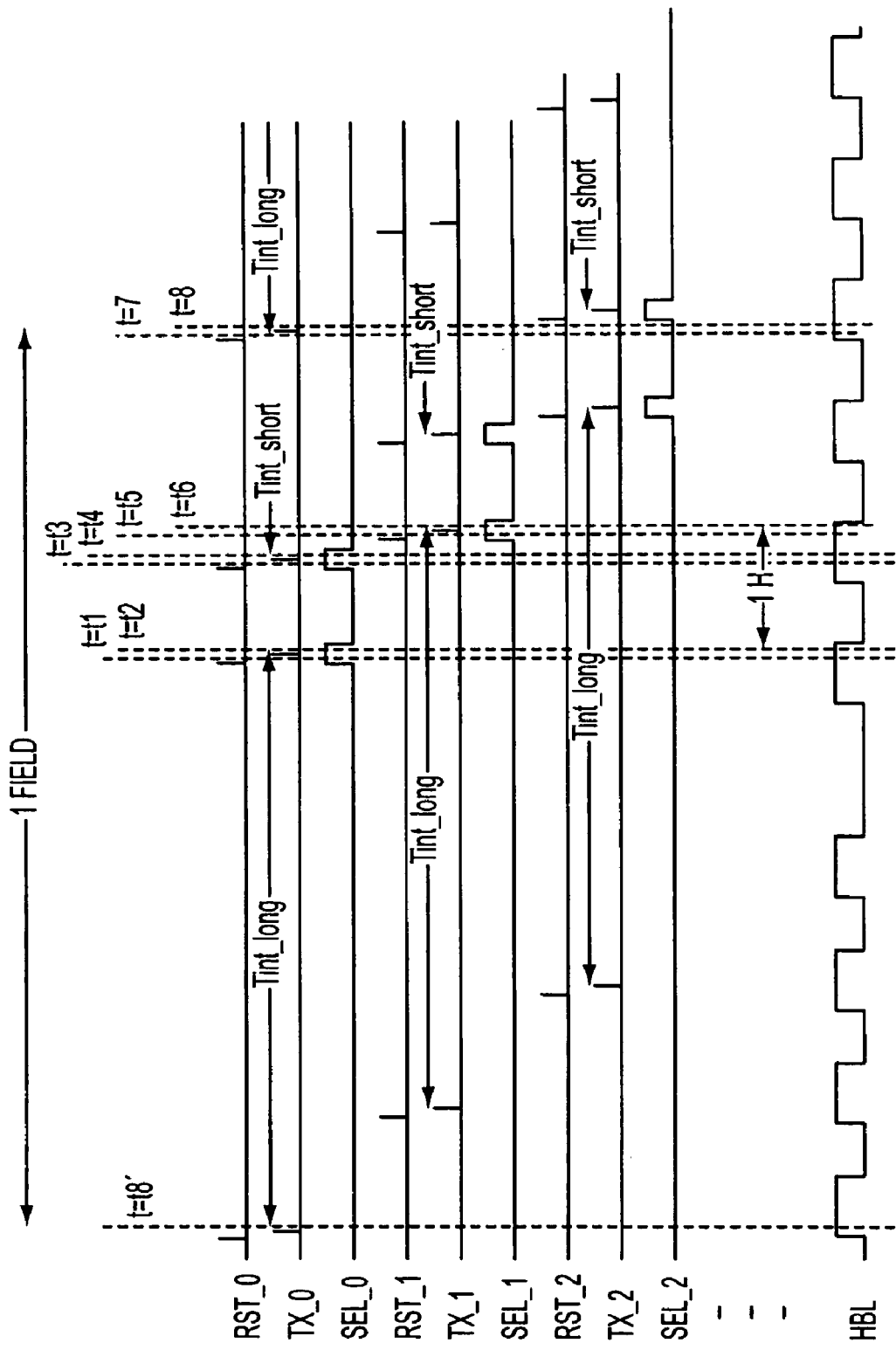
FIG. 6 is an exemplary timing diagram illustrating the operation of the invention.

The operation of the image sensor 100 is now described in more detail with respect to the exemplary timing diagram illustrated in FIG. 6. In the timing diagram, Tint_long represents the duration of the long integration period and Tint_short represents the duration of the short integration period. Further, FIG. 6 illustrates reset control signals RST_0, RST_1, RST_2 respectively for e.g., rows ROW I, ROW(I+1), ROW(I+2). Likewise, FIG. 6 illustrates transfer control TX_0, TX_1, TX2 and row select signals SEL_0, SEL_1, SEL_2 respectively for e.g., rows ROW I, ROW(I+1), ROW(I+2). The timing of the horizontal blanking period (HBL) is also shown.

Referring to FIGS. 5 and 6, at time t1, previously reset pixels in a selected row (SEL_0 asserted) are read out into the readout circuitry 150. It should be appreciated that the reset pixels can be read out at anytime between the time the reset control signal RST_0 is asserted and the end of the long integration period. Shortly thereafter, at time t2, pixel signals Vsig(long) obtained during the long integration period (Tint_long) are transferred (TX_0 asserted) and read out into the readout circuitry 150. For each read-out pixel, a differential signal Vout_L=Vrst−Vsig(long) is generated, amplified and digitized in the readout circuitry 150. The selector circuit 145 checks each Vout_L signal to determine if they have reached Vmax and sets the corresponding flag bit accordingly (e.g., if Vout_L<Vmax then flag bit=0; if Vout_L≧Vmax then flag bit=1). The Vout_L signals and associated flag bits for each pixel in the selected row are written into the first memory 140.

The pixels are reset once again (starting the short integration period Tint_short) and after approximately one horizontal line period (1H) has passed (time t3), the value of the reset pixels in the selected row (SEL_0 asserted) are read out into the readout circuitry 150. Shortly thereafter, at time t4, pixel signals Vsig(short) obtained during the short integration period (Tint_short) are transferred (TX_0 asserted) and readout into the readout circuitry 150. For each readout pixel, a differential signal Vout_S=Vrst−Vsig(short) is generated, amplified and digitized in the readout circuitry 150. For each pixel, the selector 145 checks the first memory 140 to determine if the pixel's flag bit has been set. If the pixel's flag bit has been set (e.g., flag bit=1) the selector 145 overwrites the previously stored Vout_L with the newly generated Vout_S and leaves the flag bit set. If the selector 145 determines that that the pixel's flag bit has not been set (i.e., flag bit=0), the Vout_S is not written into the first memory 140 (leaving Vout_L).

The data stored in the first memory 140 is then transferred to the second memory 130 where the data is output for further processing (described below in more detail with respect to FIG. 9). The same procedure is then performed for the other rows in the array 160. It should be noted that the above operations were described using a rolling shutter technique (i.e., row by row integration). It should be appreciated, however, that the invention is also suitable for use with a global shutter operation in which all of the rows are subject to the integration periods at the same time.

Figure 7:
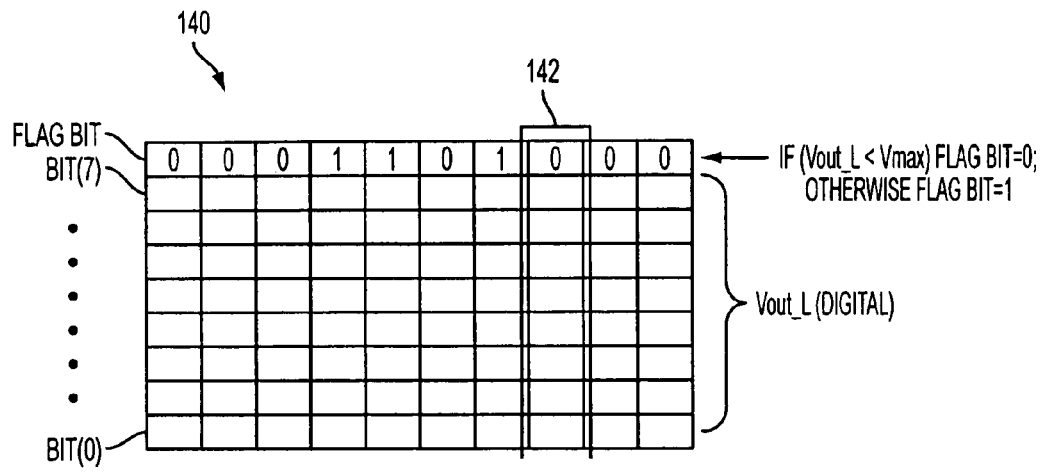
FIGS. 7 and 8 illustrate an exemplary organization of a memory device in accordance with an embodiment of the invention.
Figure 8:
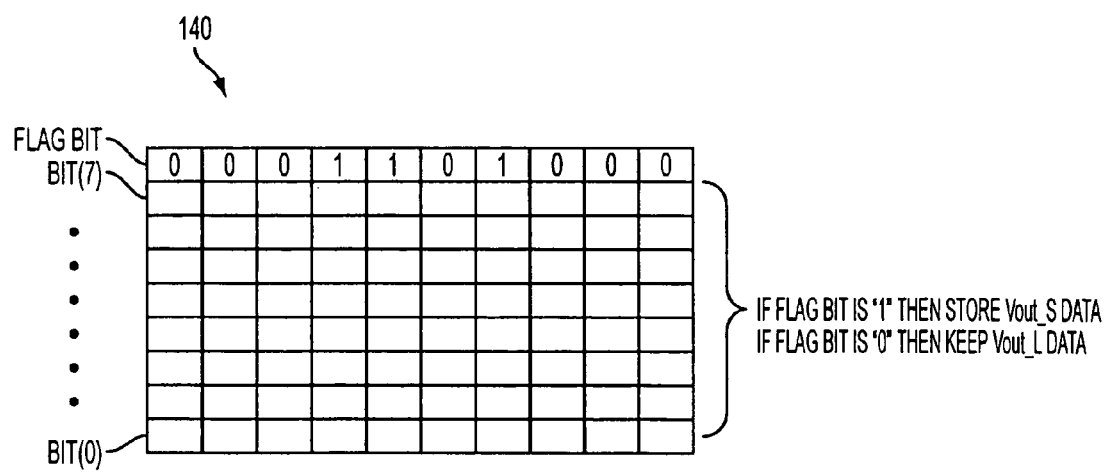

FIGS. 7 and 8 illustrate an exemplary organization of the first memory 140 used in the sensor 100 (FIG. 5). The memory 140 contains entries 142 for each pixel to be readout. Each entry 142 contains a flag bit and data bits bit(7), . . . , bit(0). In the present example, each entry 142 contains eight data bits(7), . . . , bit(0), but it should be understood that the number of data bits will correspond to the resolution of the imaging device and is not limited to eight bits. As explained above, in the current example, when a pixel's Vout_L is less than the Vmax threshold, a "0" is written into the flag bit location. On the other hand, when Vout_L greater than or equal to Vmax, then a "1" is written into the pixel's flag bit location.

Once the short integration period signals Vout_S are obtained, the selector checks the flag bit in each entry 142 and determines whether the currently stored Vout_L data needs to be overwritten or retained. If the pixel's entry 142 contains a flag bit indicating saturation during the long integration period (e.g., flag bit=1), then the Vout_S digital data overwrites the previously stored bits bit(7), ..., bit(0); otherwise, the Vout_L data is retained. In either case, the flag bit is always retained since it is used in further image processing (described below with respect to FIG. 9). The stored information is then processed to generate a synthesized output having a wide dynamic range.

Figure 9:
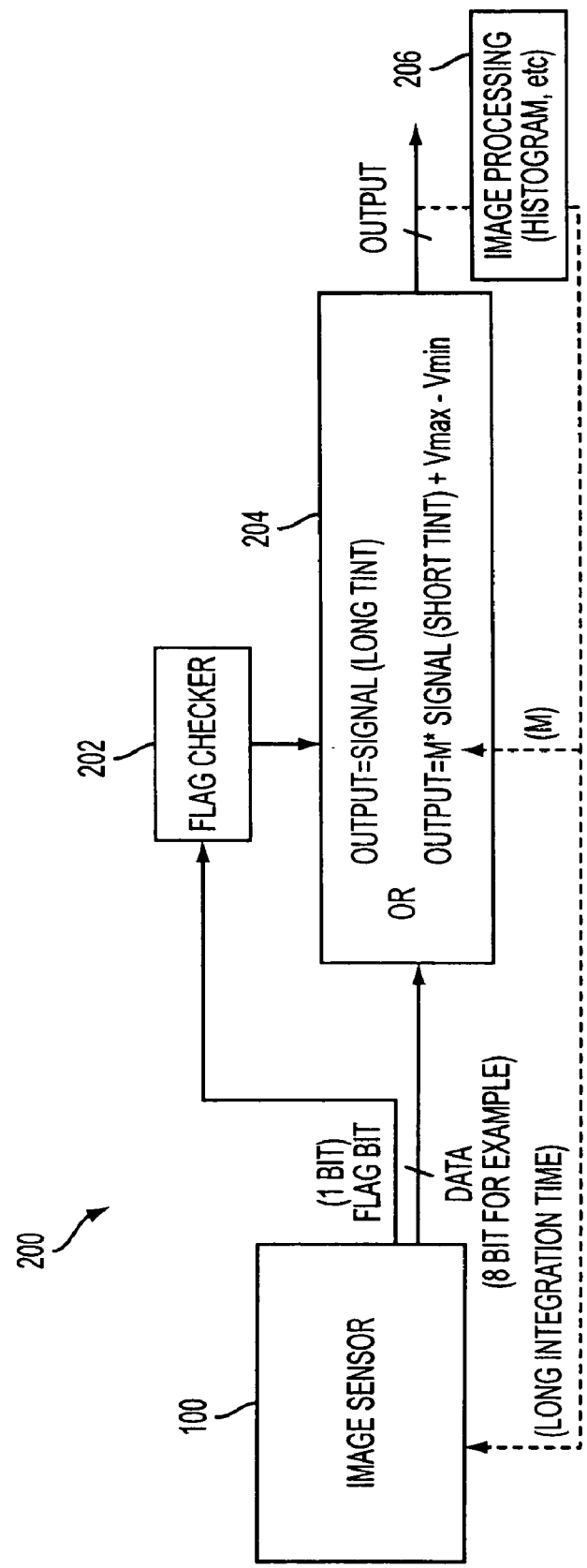
FIG. 9 illustrates an imaging device constructed in accordance with an embodiment of the invention.

FIG. 9 illustrates an exemplary imaging device 200 constructed in accordance with an embodiment of the invention. The imaging device 200 includes the image sensor 100 illustrated in FIG. 5, a flag checker 202, a synthesizer block 204 and an image processing block 206. In a desired embodiment, the flag checker 202, synthesizer block 204 and image processing block 206 are contained within the same image processor.

The flag bit information stored in the second memory 130 (FIG. 5) is output from the image sensor 100 and input into the flag checker 202. The pixel signal data bit(7), ..., bit(0) is output from the image sensor 100 and input into the synthesizer block 204. The flag checker 202, which may also be part of the synthesizer block 204, sends a signal to the synthesizer block 204 indicating for the particular pixel whether the flag bit indicates saturation during the long integration period or not.

If the flag bit indicates no saturation (e.g., flag bit=0), the synthesizer block 204 generates an output using equation (1) described above, which is equal to the input data bits bit(7), ..., bit(0) (i.e., Vout_L (shown as "signal (Long Tint)" on FIG. 9). If the flag bit indicates saturation, the synthesizer block 204 generates an output using equation (2) described above (i.e., M*Vout_S (shown as "signal (Short Tint)" on FIG. 9)+Vmax−Vmin). The synthesized output OUTPUT may be used by the image processing block 206 to perform needed signal processing. The image processing block 206 can use the synthesized output OUTPUT to generate M and to determine the long integration period (e.g., control the generation of the TX and RST control signals).

Figure 10:
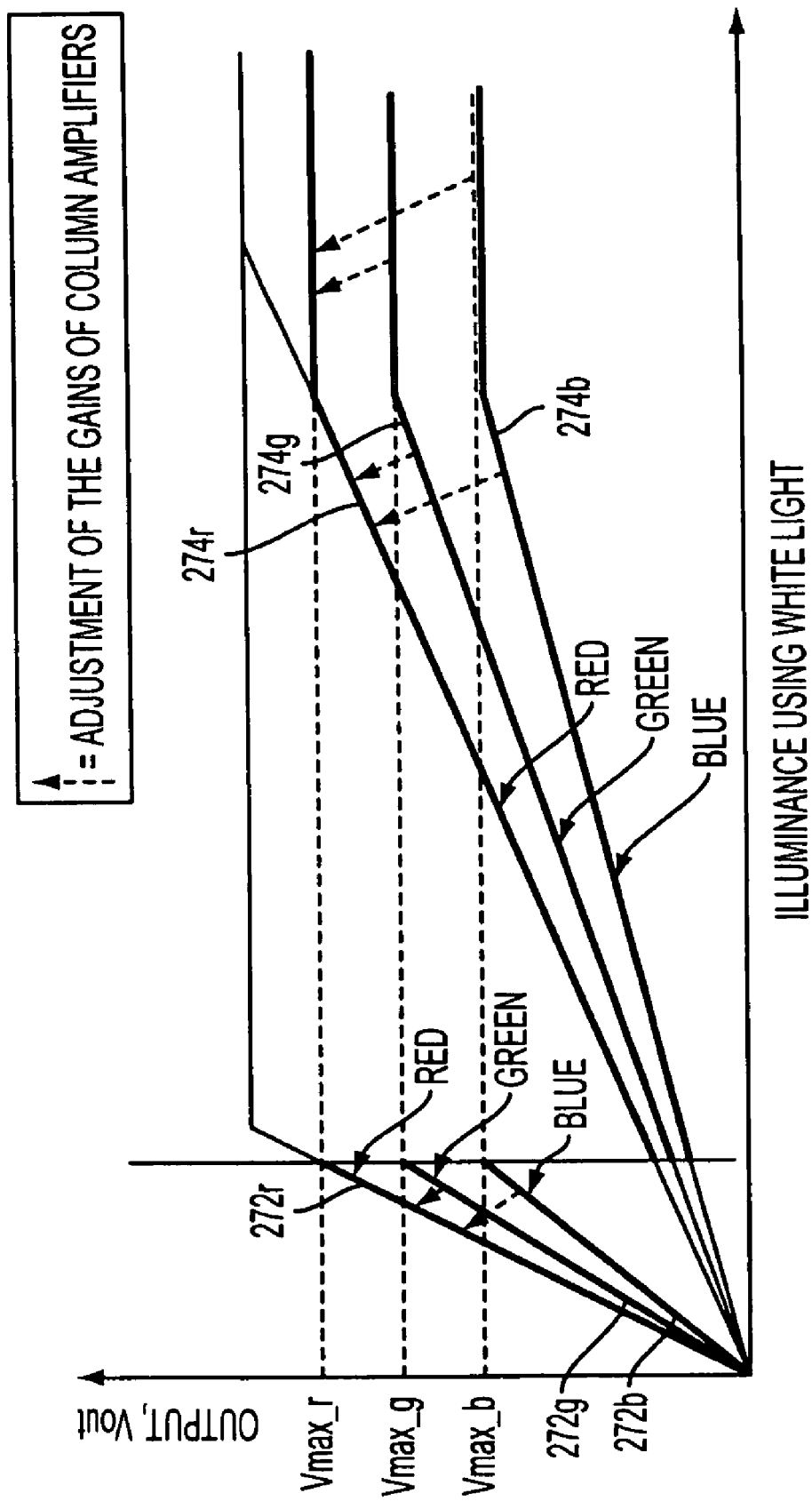
FIG. 10 is a graph illustrating pixel output v. illuminance for red, blue and green pixels signals from long and short integration periods.

To get a color signal, the image sensor 100 will have a color filter (e.g., such as Bayer matrix color filter). The sensitivity of each color signal is different. As such, if the same Vmax is used for the different color signals (i.e., red, blue, green), the knee points of each color signal will diverge from each other with respect to the illuminance axis. This is undesirable since it may complicate obtaining a proper white balance. To simplify the white balance process, the knee points should be the same with respect to the illuminance axis. As shown in FIG. 10, three thresholds Vmax_r, Vmax_g and Vmax_b are used for red, green and blue pixel readout channels, respectively. Using the column parallel architecture, the gain of column amplifiers can be set to appropriate values for each color channel. Output signal characteristics can be set to e.g., the characteristics used in the red channel.

Figure 11:
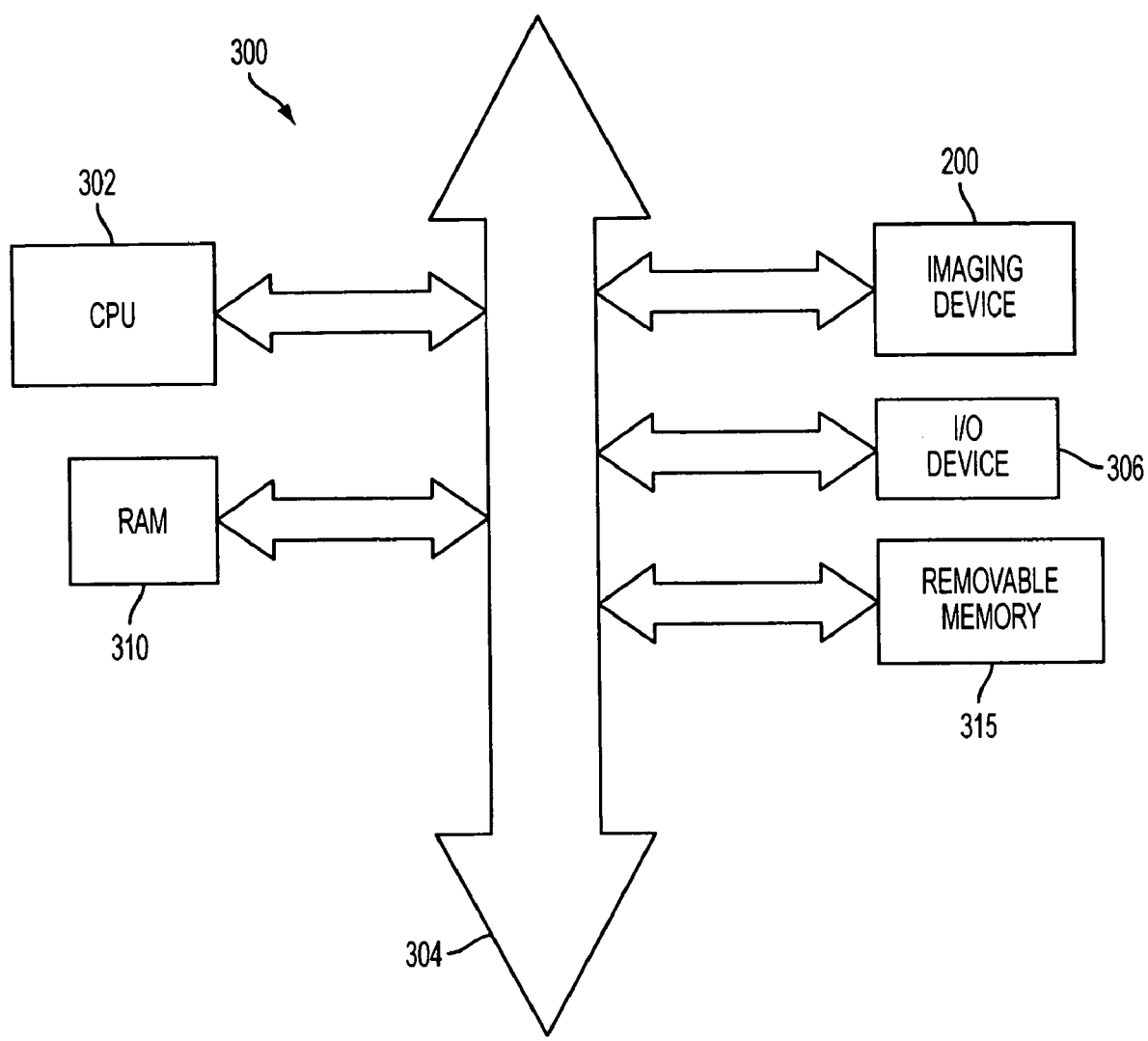
FIG. 11 shows a processor system incorporating at least one imager constructed in accordance with an embodiment of the invention.

FIG. 11 shows system 300, a typical processor system modified to include an imager device 200 (FIG. 9) of the invention. The processor-based system 300 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 300, for example a camera system, generally comprises a central processing unit (CPU) 302, such as a microprocessor, that communicates with an input/output (I/O) device 306 over a bus 304. Imaging device 200 also communicates with the CPU 302 over the bus 304. The processor-based system 300 also includes random access memory (RAM) 310, and can include removable memory 315, such as flash memory, which also communicate with the CPU 302 over the bus 304. The imaging device 200 may be combined with a processor, such as a CPU, digital signal processor, or microprocessor, with or without memory storage on a single integrated circuit or on a different chip than the processor.

It should be appreciated that other embodiments of the invention include a method of manufacturing the devices 100, 200 of the invention as illustrated in FIGS. 5 and 9. For example, in one exemplary embodiment, a method of manufacturing an imaging device comprises the acts of providing an array of pixels organized as a plurality of rows and columns; providing a column readout circuit connected to the columns, wherein said column readout circuit inputs from each column first signals associated with a first integration period and second signals associated with a second integration period, and wherein said column readout circuit outputs for each column a first digital value corresponding to the first signals and a second digital value corresponding to the second signals; providing a first memory; and providing a selector circuit connected to receive the first and second digital values, wherein said selector stores for each column the first digital value and a corresponding indicator into the first memory, the indicator having a first state if the first digital value reached a predetermined threshold and a second state if the first digital value did not reach the predetermined threshold, wherein said selector stores into the first memory the second digital value for a column if the corresponding indicator is in the first state.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Any modification, though presently unforeseeable, of the present invention that comes within the spirit and scope of the following claims should be considered part of the present invention.

What is claimed as new and desired to be protected by Letters Patent of the United States is:

1. An imaging device comprising:
   an array of pixels organized as a plurality of rows and columns;
   a column readout circuit connected to the columns, said column readout circuit inputting from each column first signals associated with a first integration period and second signals associated with a second integration period, said column readout circuit outputting for each column a first digital value corresponding to the first signals and a second digital value corresponding to the second signals;
   a first memory; and
   a selector circuit connected to receive the first and second digital values, said selector storing for each column the first digital value and a corresponding indicator into the first memory, the indicator having a first state if the first digital value reached a predetermined threshold and a second state if the first digital value did not reach the predetermined threshold, wherein said selector stores into the first memory the second digital value for a column if the corresponding indicator is in the first state.

2. The imaging device of claim 1, wherein the first integration period is longer than the second integration period.

3. The imaging device of claim 2, wherein the first signals for a column comprise a reset signal obtained at a start of the first integration period and a pixel signal obtained during the first integration period.

4. The imaging device of claim 3, wherein the second signals for a column comprise a reset signal obtained at a start of the second integration period and a pixel signal obtained during the second integration period.

5. The imaging device of claim 1, wherein the second integration period is no longer than a horizontal line period.

6. The imaging device of claim 1, wherein the predetermined threshold comprises a voltage level corresponding to a pseudo saturation level of the pixels.

7. The imaging device of claim 1, further comprising:
a second memory, wherein the contents of the first memory are copied into the second memory; and
image processing circuitry, said image processing circuitry using the information from the second memory to generate and output synthesized pixel output signals for each readout pixel.

8. The imaging device of claim 7, wherein for each pixel having an indicator in the first state, the image processing circuit generates the synthesized output by adding the second digital value to a value corresponding to the difference between the predetermined threshold and a minimum threshold for the second digital value.

9. The imaging device of claim 7, wherein for each pixel having an indicator in the second state, the image processing circuit generates the synthesized output using the first digital value.

10. The imaging device of claim 7, wherein the image processing circuitry comprises:
a flag checker for checking and outputting the state of each indicator;
a synthesizer block for generating the synthesized output based on the state of the indicator; and
an image processing block for providing processing information to the synthesizer block.

11. The imaging device of claim 1, wherein the first and second digital values represent colored pixel signals and the predetermined threshold comprises a plurality of color signal thresholds, and wherein said digital selector determines a color associated with each first digital value and compares the first digital value to the respective color threshold in order to set the flag to one of the first and second states.

12. A CMOS imaging device comprising:
an array of pixels organized as a plurality of rows and columns;
means for inputting from each column first signals associated with a first integration period and second signals associated with a second integration period;
means for generating a first digital value corresponding to the first signals and a second digital value corresponding to the second signals;
means for storing each first digital value;
means for overwriting each first digital value with its corresponding second digital value when the first digital value has reached a predetermined threshold; and
means for generating a synthesized pixel output for each readout pixel based on the stored first and second digital values.

13. The imaging device of claim 12, wherein the first integration period is longer than the second integration period.

14. The imaging device of claim 12, wherein the first signals for a column comprise a reset signal obtained at a start of the first integration period and a pixel signal obtained during the first integration period.

15. The imaging device of claim 14, wherein the second signals for a column comprise a reset signal obtained at a start of the second integration period and a pixel signal obtained during the second integration period.

16. The imaging device of claim 12, wherein the second integration period is no longer than a horizontal line period.

17. The imaging device of claim 12, wherein the predetermined threshold comprises a voltage level corresponding to a pseudo saturation level of the pixels.

18. A processor system comprising:
an imaging device comprising:
an array of pixels organized as a plurality of rows and columns;
a column readout circuit connected to the columns, said column readout circuit inputting from each column first signals associated with a first integration period and second signals associated with a second integration period, said column readout circuit outputting for each column a first digital value corresponding to the first signals and a second digital value corresponding to the second signals;
a first memory; and
a selector circuit connected to receive the first and second digital values, said selector storing for each column the first digital value and a corresponding flag indicator into the first memory, the flag indicator having a first state if the first digital value reached a predetermined threshold and a second state if the first digital value did not reach the predetermined threshold, wherein said selector storing into the first memory the second digital value for a column if the corresponding flag indicator is in the first state.

19. The system of claim 18, wherein the first integration period is longer than the second integration period.

20. The system of claim 19, wherein the first signals for a column comprise a reset signal obtained at a start of the first integration period and a pixel signal obtained during the first integration period.

21. The system of claim 20, wherein the second signals for a column comprise a reset signal obtained at a start of the second integration period and a pixel signal obtained during the second integration period.

22. The system of claim 18, wherein the second integration period is no longer than a horizontal line period.

23. The system of claim 18, wherein the predetermined threshold comprises a voltage level corresponding to a pseudo saturation level of the pixels.

24. The system of claim 18, wherein said imaging device further comprises:
a second memory, wherein the contents of the first memory are copied into the second memory; and
image processing circuitry, said image processing circuitry using the information from the second memory to generate and output synthesized pixel output signals for each readout pixel.

25. The system of claim 24, wherein for each pixel having a flag indicator in the first state, the image processing circuit generates the synthesized output by adding the second digital value to a value corresponding to the difference between the predetermined threshold and a minimum threshold for the second digital value.

26. The system of claim 24, wherein for each pixel having a flag indicator in the second state, the image processing circuit generates the synthesized output using the first digital value.

27. The system of claim 24, wherein the image processing circuitry comprises:
a flag checker for checking and outputting the state of each flag indicator;
a synthesizer block for generating the synthesized output based on the state of the flag indicator; and
an image processing block for providing processing information to the synthesizer block.

28. The system of claim 18, wherein the first and second digital values represent colored pixel signals and the predetermined threshold comprises a plurality of color signal thresholds, and wherein said selector determines a color associated with each first digital value and compares the first digital value to the respective color threshold in order to set the flag to one of the first and second states.

29. A processor system comprising:
A CMOS imaging device comprising:
an array of pixels organized as a plurality of rows and columns;
means for inputting from each column first signals associated with a first integration period and second signals associated with a second integration period;
means for generating a first digital value corresponding to the first signals and a second digital value corresponding to the second signals;
means for storing each first digital value;
means for overwriting each first digital value with its corresponding second digital value when the first digital value has reached a predetermined threshold; and
means for generating a synthesized pixel output for each readout pixel based on the stored first and second digital values.

30. The system of claim 29, wherein the first integration period is longer than the second integration period.

31. The system of claim 29, wherein the first signals for a column comprise a reset signal obtained at a start of the first integration period and a pixel signal obtained during the first integration period.

32. The system of claim 30, wherein the second signals for a column comprise a reset signal obtained at a start of the second integration period and a pixel signal obtained during the second integration period.

33. The system of claim 29, wherein the second integration period is no longer than a horizontal line period.

34. The system of claim 29, wherein the predetermined threshold comprises a voltage level corresponding to a pseudo saturation level of the pixels.

35. A method of manufacturing an imaging device, said method comprising the acts of:
providing an array of pixels organized as a plurality of rows and columns;
providing a column readout circuit connected to the columns, wherein said column readout circuit inputs from each column first signals associated with a first integration period and second signals associated with a second integration period, and wherein said column readout circuit outputs for each column a first digital value corresponding to the first signals and a second digital value corresponding to the second signals;
providing a first memory; and
providing a selector circuit connected to receive the first and second digital values, wherein said selector stores for each column the first digital value and a corresponding indicator into the first memory, the indicator having a first state if the first digital value reached a predetermined threshold and a second state if the first digital value did not reach the predetermined threshold, wherein said selector stores into the first memory the second digital value for a column if the corresponding indicator is in the first state.

36. The method of claim 35, wherein said act of providing the column readout circuit comprises:
providing sample and hold circuitry connected to each column;
providing a differential amplifier connected to receive each column output from the sample and hold circuitry; and
providing an analog-to-digital converter connected to the output of the differential amplifier.

37. The method of claim 35, further comprising the acts of:
providing a second memory, wherein the contents of the first memory are copied into the second memory; and
providing image processing circuitry, wherein said image processing circuitry uses the information from the second memory to generate and output synthesized pixel output signals for each readout pixel.

38. The method of claim 37, wherein the act of providing the image processing circuitry comprises:
providing a flag checker for checking and outputting the state of each indicator;
providing a synthesizer block for generating the synthesized output based on the state of the indicator; and
providing an image processing block for providing processing information to the synthesizer block.

39. A method of operating an imaging device comprising the acts of:
starting a first integration period;
inputting from each column of pixels in a pixel array respective first signals associated with the first integration period;
converting the first signals into respective first digital values;
setting respective flags to a first state if their associated first digital value has exceeded a predetermined threshold and setting the flags to a second state if their associated first digital value has not exceeded the predetermined threshold;
storing the first digital values and the state of the flags into a first memory;
starting a second integration period;
inputting from each column second signals associated with the second integration period;
converting the second signals into respective second digital values;
storing the second digital values whose corresponding flags are set to the first state; and
generating a respective synthesized pixel output from the stored first and second values.

40. The method of claim 39, wherein the first integration period is longer than the second integration period.

41. The method of claim 39, wherein the first signals comprise a reset signal obtained at the start of the first integration period and a pixel signal obtained during the first integration period.

42. The method of claim 41, wherein the second signals comprise a reset signal obtained at the start of the first integration period and a pixel signal obtained during the second integration period.

43. The method of claim 39, wherein the second integration period is no longer than a horizontal line period.

44. The method of claim 39, wherein the predetermined threshold comprises a voltage level corresponding to a pseudo saturation level of the pixels.

45. The method of claim 39, further comprising the act of copying the first and second digital values and flags into a second memory prior to generating the synthesized pixel output.

46. The method of claim 39, wherein for each pixel having a flag bit in the first state, said generating act generates the synthesized output by adding the second digital value to a value corresponding to the difference between the predetermined threshold and a minimum threshold for the second digital value.

47. The method of claim 39, wherein for each pixel having a flag bit in the second state, said generating act generates the synthesized output using the first digital value.

48. The method of claim 39, wherein the first and second digital values represent colored pixel signals and the predetermined threshold comprises a plurality of color signal thresholds.

* * * * *